(12) United States Patent
Doing et al.

(10) Patent No.: US 8,131,976 B2
(45) Date of Patent: Mar. 6, 2012

(54) TRACKING EFFECTIVE ADDRESSES IN AN OUT-OF-ORDER PROCESSOR

(75) Inventors: Richard W. Doing, Raleigh, NC (US); Susan E. Eisen, Round Rock, TX (US); David S. Levitan, Austin, TX (US); Kevin N. Magill, Raleigh, NC (US); Brian R. Mestan, Austin, TX (US); Balaram Sinharoy, Poughkeepsie, NY (US); Benjamin W. Stolt, Austin, TX (US); Jeffrey R. Summers, Raleigh, NC (US); Albert J. Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/422,595

(22) Filed: Apr. 13, 2009

(65) Prior Publication Data

US 2010/0262806 A1    Oct. 14, 2010

(51) Int. Cl.
| G06F 9/30 | (2006.01) |
| G06F 9/40 | (2006.01) |
| G06F 7/38 | (2006.01) |
| G06F 9/00 | (2006.01) |
| G06F 9/44 | (2006.01) |
| G06F 9/26 | (2006.01) |
| G06F 9/34 | (2006.01) |

(52) U.S. Cl. .................. 712/205; 712/239; 711/203

(58) Field of Classification Search .................. None
See application file for complete search history.

(56) References Cited

U.S. PATENT DOCUMENTS

| 4,277,826 | A  | * | 7/1981 | Collins et al. | 711/206 |
| 6,266,768 | B1 | * | 7/2001 | Frederick et al. | 712/220 |
| 7,475,226 | B2 | * | 1/2009 | Le et al. | 712/218 |
| 2003/0033441 | A1 | * | 2/2003 | Forin et al. | 709/315 |
| 2004/0153622 | A1 | * | 8/2004 | Asakawa | 711/214 |
| 2005/0210224 | A1 | * | 9/2005 | Col et al. | 712/238 |
| 2007/0043531 | A1 | * | 2/2007 | Kosche et al. | 702/182 |
| 2008/0209268 | A1 | * | 8/2008 | Williams et al. | 714/25 |
| 2009/0049286 | A1 | * | 2/2009 | Levitan et al. | 712/237 |
| 2009/0063823 | A1 | * | 3/2009 | Burky et al. | 712/216 |
| 2009/0328232 | A1 | * | 12/2009 | Safford, III | 726/26 |

* cited by examiner

*Primary Examiner* — Eddie P Chan
*Assistant Examiner* — William Partridge
(74) *Attorney, Agent, or Firm* — Stephen J. Walder, Jr.; Diana R. Gerhardt

(57) ABSTRACT

Mechanisms, in a data processing system, are provided for tracking effective addresses through a processor pipeline of the data processing system. The mechanisms comprise logic for fetching an instruction from an instruction cache and associating, by an effective address table logic in the data processing system, an entry in an effective address table (EAT) data structure with the fetched instruction. The mechanisms further comprise logic for associating an effective address tag (eatag) with the fetched instruction, the eatag comprising a base eatag that points to the entry in the EAT and an eatag offset. Moreover, the mechanisms comprise logic for processing the instruction through the processor pipeline by processing the eatag.

22 Claims, 9 Drawing Sheets

TRACKING EFFECTIVE ADDRESSES IN AN OUT-OF-ORDER PROCESSOR

This invention was made with United States Government support under Agreement No. HR0011-07-9-0002 awarded by DARPA. THE GOVERNMENT HAS CERTAIN RIGHTS IN THE INVENTION.

BACKGROUND

The present application relates generally to an improved data processing apparatus and method and more specifically to mechanisms for tracking effective addresses in an out-of-order processor.

Most modern computing devices provide support for the concept of virtual memory. Virtual memory is a technique by which application programs are given the impression that they have a contiguous working memory, or address space, when in fact the physical memory may be fragmented and may even overflow onto disk storage. Essentially, the application program is given a view of the memory of the computing device where the application accesses a seemingly contiguous memory using an effective address, in the effective address space visible to the application, which is then translated into a physical address of the actual physical memory or storage device(s) to actually perform the access operation. An effective address is the value which is used to specify a memory location that is to be accessed by the operation from the perspective of the entity, e.g., application, process, thread, interrupt handler, kernel component, etc., issuing the operation.

That is, if a computing device does not support the concept of virtual memory, then the effective address and the physical address are one and the same. However, if the computing device does support virtual memory, then the effective address of the particular operation submitted by the application is translated by the computing device's memory mapping unit into a physical address which specifies the location in the physical memory or storage device(s) where the operation is to be performed.

In modern computing devices, the processors of these computing devices use processor instruction pipelines, comprising a series of data processing elements, to process instructions (operations) submitted by entities, e.g., applications, processes, etc. Instruction pipelining is a technique to increase instruction throughput by splitting the processing of computer instructions into a series of steps with storage at the end of each step. This allows the computing device's control circuitry to issue instructions to the processor instruction pipeline at the processing rate of the slowest step which is much faster than the time needed to perform all steps at once. Processors with instruction pipelining, i.e. pipelined processors, are internally organized into stages which can semi-independently work on separate jobs. Each stage is organized and linked with a next stage in a series chain so that each stage's output is fed to another stage until the final stage of the pipeline.

Such pipelined processors may take the form of in-order or out-of-order pipelined processors. For in-order pipelined processors, instructions are executed in order such that if data is not available for the instruction to be processed at a particular stage of the pipeline, execution of instructions through the pipeline may be stalled until the data is available. Out-of-order pipelined processors, on the other hand, allow the processor to avoid stalls that occur when the data needed to perform an operation are unavailable. The out-of-order processor instruction pipeline avoids these stalls by filling in "slots" in time with other instructions that are ready to be processed and then re-ordering the results at the end of the pipeline to make it appear that the instructions were processed in-order. The way the instructions are ordered in the original computer code is known as program order, whereas in the processor they are handled in data order, i.e. the order in which the data and operands become available in the processor's registers.

SUMMARY

In one illustrative embodiment, a method, in a data processing system, is provided for tracking effective addresses through a processor pipeline of the data processing system. The method comprises fetching an instruction from an instruction cache and associating, by effective address table logic in the data processing system, an entry in an effective address table (EAT) data structure with the fetched instruction. The method further comprises associating an effective address tag (eatag) with the fetched instruction, the eatag comprising a base eatag that points to the entry in the EAT and an eatag offset that identifies an instruction associated with the entry in the EAT. Moreover, the method comprises processing the instruction through the processor pipeline by processing the eatag.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
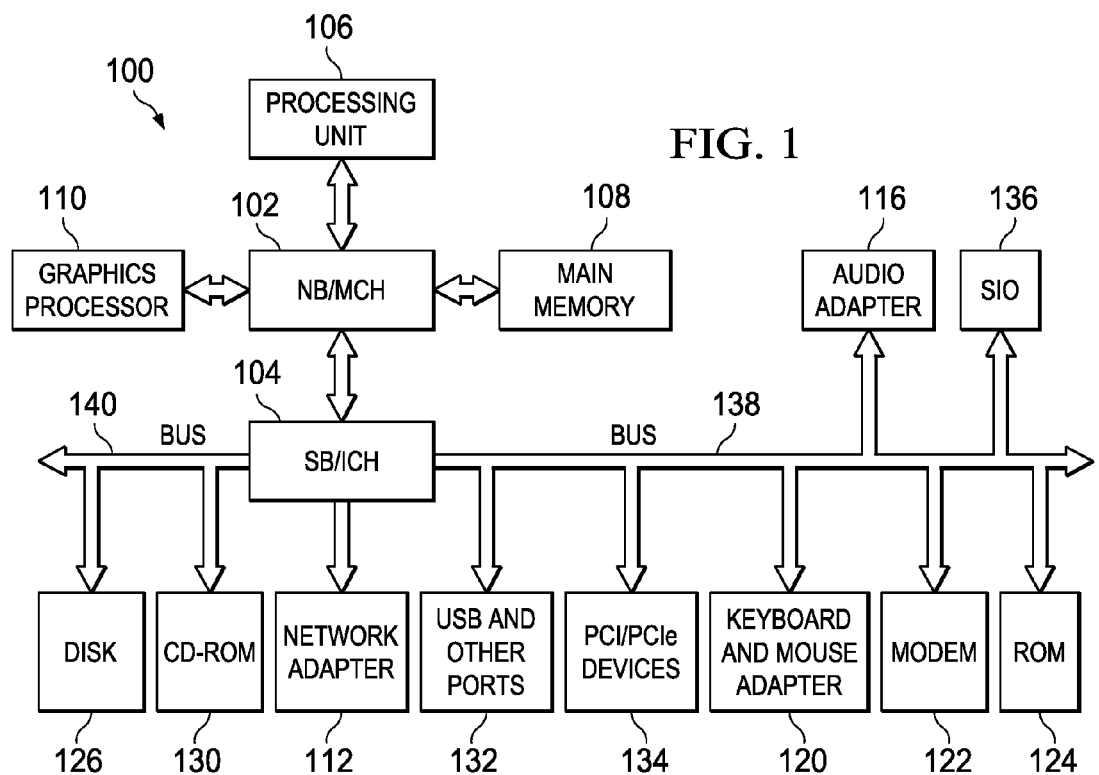
FIG. 1 is a simplified example block diagram of one type of data processing system in which the illustrative embodiments may be implemented.

The illustrative embodiments provide mechanisms for tracking effective addresses in an out-of-order processor. The mechanisms of the illustrative embodiments eliminate the need to pass the effective address from one stage to the next in the pipeline and further allow tracking of the effective address even with out-of-order execution while minimizing area and power requirements.

Modern processor instruction pipelines track an instruction's effective address as the instruction flows through the instruction pipeline. It is important to track the instruction's effective address because this effective address is utilized whenever the processing of an instruction results in the taking of an exception, the instruction flushes to a prior state, the instruction branches to a new memory location relative to its current memory location, or the instruction completes its execution.

Tracking an instruction's effective address is costly in terms of processor chip area, power consumption, and the like. This is because these effective addresses have large sizes (e.g., 64 bits) and modern processor instruction pipelines are deep, i.e. have many stages, causing the lifetime of an instruction from an instruction fetch stage of the processor instruction pipeline to a completion stage of the processor instruction pipeline to be very long. This cost may be further increased in highly multithreaded out-of-order processors, i.e. processors that execute instructions from multiple threads in an out-of-order manner, since a vast number of instructions from different address ranges can be processing, i.e. are "in flight," at the same time.

Traditionally, such as in the POWER5™ processor available from International Business Machines Corporation (IBM) of Armonk, N.Y., computing devices use a combination of pipeline latches, a branch information queue (BIQ), and a global completion table (GCT) to track an instruction's effective address. The base effective address (EA) for a group of instructions is transferred from the front-end of the pipeline using latches until it can be deposited and tracked in the GCT of the instruction sequencer unit (ISU). The number of latches needed to store this data is on the order of the number of pipeline stages between a Fetch stage and a Dispatch stage of the pipeline. This is wasteful, as the EA is typically not needed during these stages. Rather it is simply payload data that is "along for the ride" with the instruction group as it flows through the pipeline. In addition, this method leads to duplicate storage as branch instructions have their EAs in both the BIQ and the GCT.

Recently, computing devices have been developed, e.g., the POWER6™ processor also available from IBM, that remove these inefficiencies by tracking the EA solely in the GCT. With these new computing devices, an instruction sequencer unit creates an entry in the GCT at fetch time. The EA is loaded into the GCT at this time and then removed when the instruction completes. This eliminates many pipeline latches throughout the machine. Instead of a full 64-bit EA, a small tag is carried along with the instruction group through the pipeline. This tag points back to the entry in the GCT, which holds the base EA for this instruction group. Address storage in the BIQ is no longer needed as branches can retrieve their EA directly from the GCT when they issue. Mechanisms such as this improve area efficiency, but they are often too simple to be used in an out-of-order processor. Most noticeably, they lack sufficient information to process address requests arriving out of program order. In addition, these mechanisms cannot support the necessary dispatch and completion bandwidth required for out-of-order execution because they lack the ability to track instruction groups that may have been formed from multiple disjoint address ranges. Historically, such mechanisms have only supported instruction groups from a single address range, which can significantly reduce the number of instructions available to execute out-of-order.

The illustrative embodiments improve upon these mechanisms by providing an effective address table (EAT) that has the area efficiency of the GCT solution described above, but can also support a wide issue out-of-order pipeline while not inhibiting performance. The mechanisms of the illustrative embodiments use a small number of bits of resident information and a selection of effective address tags (eatags) passed through the pipeline to manage EA calculations when needed in a pipeline stage. The mechanisms of the illustrative embodiments are area efficient since large addresses are not passed through the pipeline but rather, are held in a central repository and retrieved only when needed. Moreover, the mechanisms of the illustrative embodiments facilitate high performance by being able to handle out-of-order flushing, out-of-order branch execution, and group formation and completion across multiple disjointed address ranges.

The illustrative embodiments may be utilized in many different types of data processing environments. FIG. 1 is a simplified example block diagram of one type of data processing system in which the illustrative embodiments may be implemented. FIG. 1 is only an example and is not intended to state or imply any limitation with regard to the features of the present invention.

With reference now to FIG. 1, a block diagram of an example data processing system is shown in which aspects of the illustrative embodiments may be implemented. Data processing system 100 is an example of a computer, such as server, client computer, stand-alone computer, or any other type of computing device, in which the processor mechanisms of the illustrative embodiments as described hereafter may be implemented.

In the depicted example, data processing system 100 employs a hub architecture including North Bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, Compact Disc Read Only Memory (CD-ROM) drive 130, universal serial bus (USB) ports and other communication ports 132, and Peripheral Component Interconnect (PCI)/Peripheral Component Interconnect Express (PCIe) devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Figure 2:
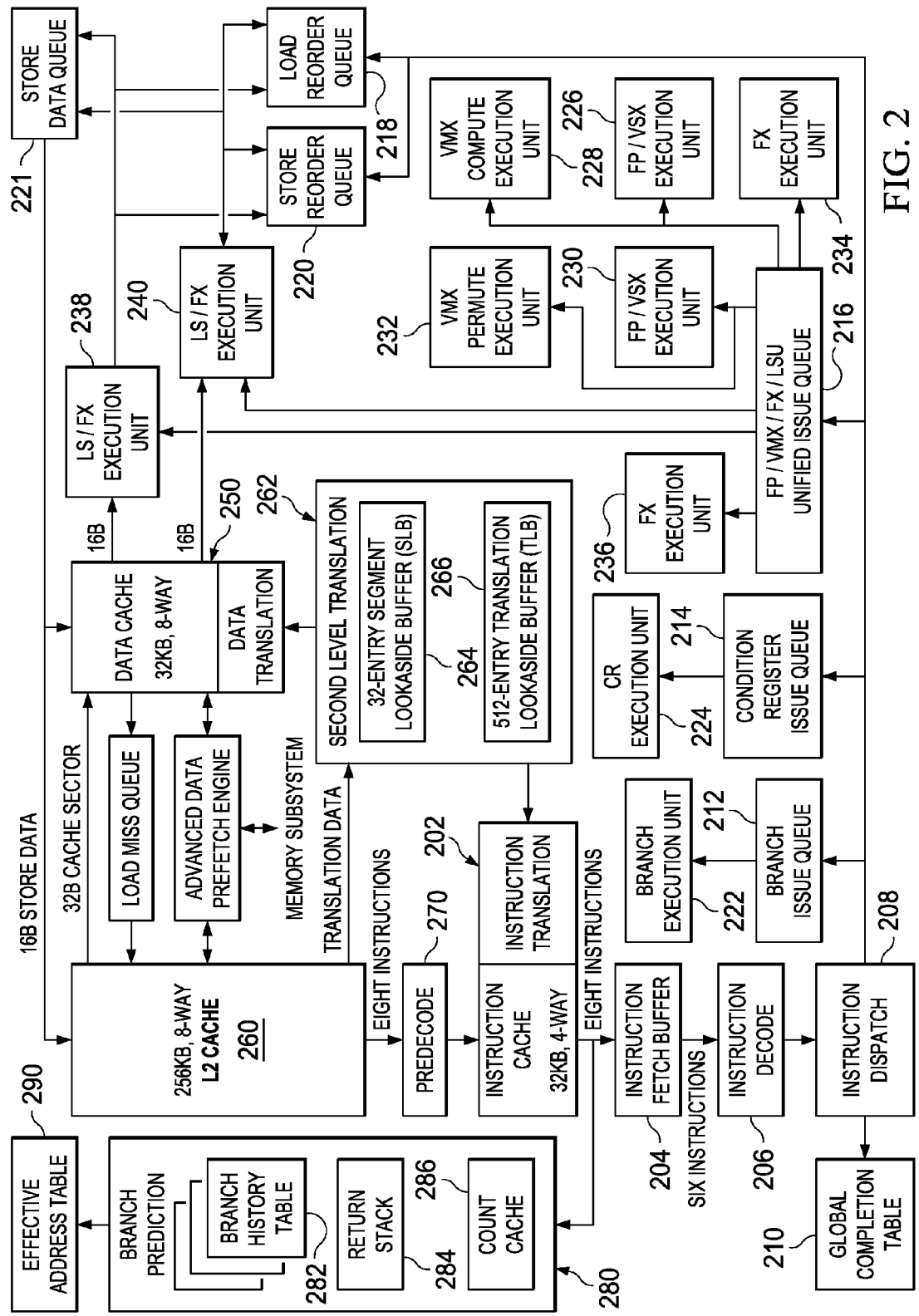
FIG. 2 is an example block diagram of a processor architecture of such a processor in accordance with one illustrative embodiment.

The processing unit 106, in accordance with the illustrative embodiments, is a processor having an architecture in which the effective address table (EAT) of the illustrative embodiments and the associated mechanisms for utilizing this EAT are implemented. FIG. 2 is an exemplary block diagram of a processor architecture of such a processor in accordance with one illustrative embodiment. As shown in FIG. 2, the processor architecture includes an instruction cache 202, an instruction fetch buffer 204, an instruction decode unit 206, and an instruction dispatch unit 208. Instructions are fetched by the instruction fetch buffer 204 from the instruction cache 202 and provided to the instruction decode unit 206. The instruction decode unit 206 decodes the instruction and provides the decoded instruction to the instruction dispatch unit 208. The output of the instruction dispatch unit 208 is provided to the global completion table 210 and one or more of the branch issue queue 212, the condition register issue queue 214, the unified issue queue 216, the load reorder queue 218, and/or the store reorder queue 220, depending upon the instruction type. The instruction type is determined through the decoding and mapping of the instruction decode unit 206. The issue queues 212-220 provide inputs to various ones of execution units 222-240. The data cache 250, and the register files contained with each respective unit, provides the data for use with the instructions.

The instruction cache 202 receives instructions from the L2 cache 260 via the second level translation unit 262 and pre-decode unit 270. The second level translation unit 262 uses its associate segment look-aside buffer 264 and translation look-aside buffer 266 to translate addresses of the fetched instruction from effective addresses to system memory addresses. The pre-decode unit partially decodes instructions arriving from the L2 cache and augments them with unique identifying information that simplifies the work of the downstream instruction decoders.

The instructions fetched into the instruction fetch buffer 204 are also provided to the branch prediction unit 280 if the instruction is a branch instruction. The branch prediction unit 280 includes a branch history table 282, return stack 284, and count cache 286. These elements predict the next effective address (EA) that should be fetched from the instruction cache. A branch instruction is a point in a computer program where flow of control is altered. It is the low-level machine instruction that is generated from control constructs in a computer program, such as if-then-else or do-while statements. A branch can be not taken, in which the flow of control is unchanged and the next instruction to be executed is the instruction immediately following it in memory, or it can be taken, in which the next instruction to be executed is an instruction at some other place in memory. If the branch is taken, a new EA needs to be presented to the instruction cache.

The EA and associated prediction information from the branch prediction unit are written into the effective address table 290. This EA will later be confirmed by the branch execution unit 222. If correct, it will remain in the table until all instructions from this address region have completed their execution. If incorrect, the branch execution unit will flush out the address and the corrected address will be written in its place.

Instructions that read from or write to memory (such as load or store instructions) are issued to the LS/EX execution unit 238, 240. The LS/EX execution unit retrieves data from the data cache 250 using a memory address specified by the instruction. This address is an effective address and needs to first be translated to a system memory address via the second level translation unit before being used. If an address is not found in the data cache, the load miss queue is used to manage the miss request to the L2 cache. In order to reduce the penalty for such cache misses, the advanced data prefetch engine predicts the addresses that are likely to be used by instructions in the near future. In this manner, data will likely already be in the data cache when an instruction needs it, thereby preventing a long latency miss request to the L2 cache.

The LS/EX execution unit 238, 240 is able to execute instructions out of program order by tracking instruction ages and memory dependences in the load reorder queue 218 and store reorder queue 220. These queues are used to detect when out-of-order execution generated a result that is not consistent with an in-order execution of the same program. In such cases, the current program flow must be flushed and performed again.

Figure 3:
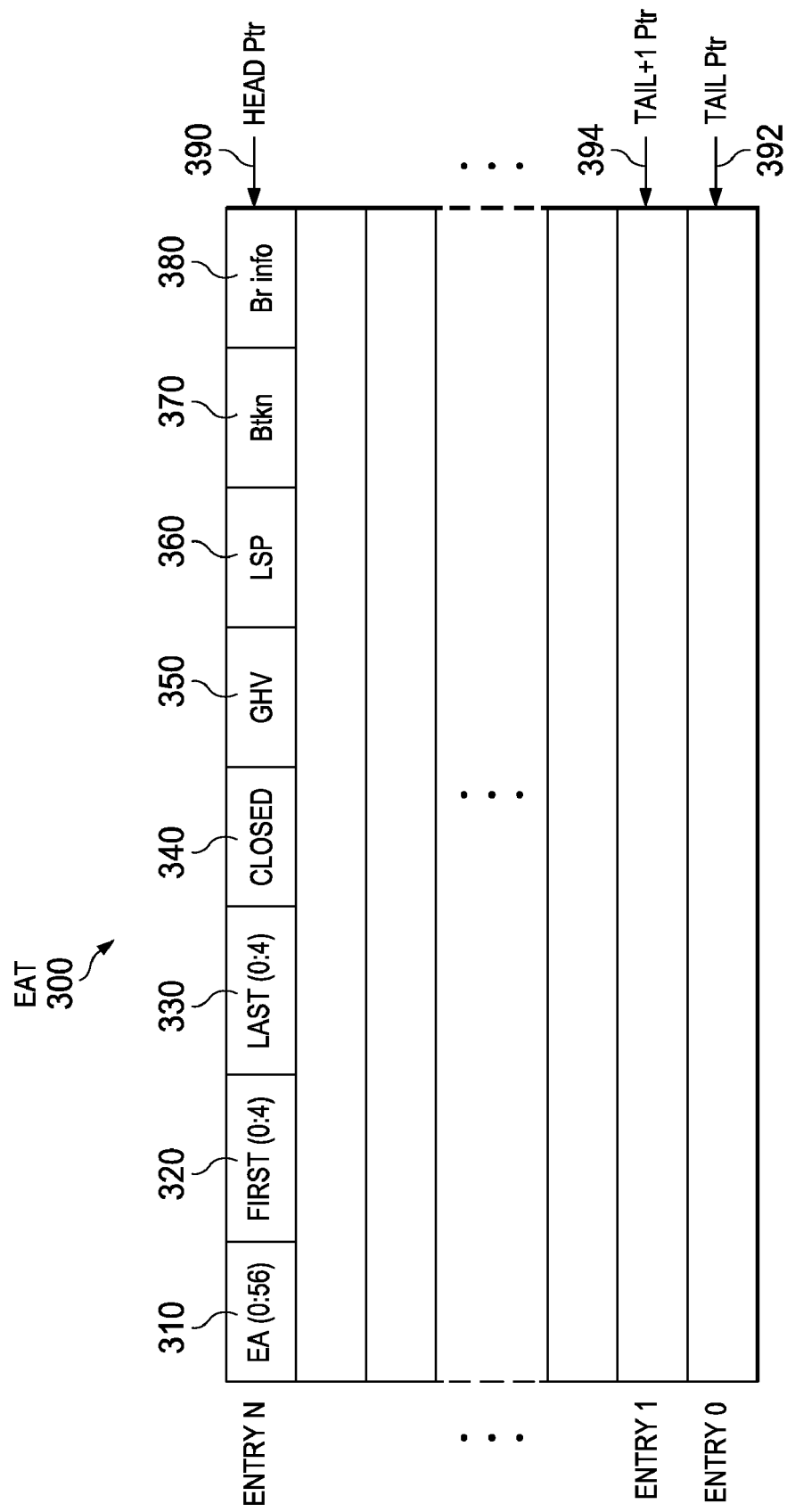
FIG. 3 is an example block of an effective address table structure in accordance with one illustrative embodiment.

As shown in FIG. 2, and of particular importance to the illustrative embodiments, the processor architecture includes an effective address table (EAT) logic unit 290 which is used to maintain the effective address of a group of instructions in a centralized manner such that the effective address is available when needed but is not required to be passed through the pipeline. Moreover, the EAT logic unit 290 comprises mechanisms for supporting out-of-order processing. FIG. 2 shows the EAT logic unit 290 being accessed via the branch prediction unit 280, however, it should be appreciated that circuitry, described hereafter with regard to FIG. 3, is provided for allowing various ones of the units shown in FIG. 2 to access the EAT logic unit 290 without having to go through the branch prediction unit 280. The operation of the EAT logic unit 290 and the mechanisms for specifically utilizing the EAT logic unit 290 will be described in greater detail hereafter.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device configured with flash memory to provide non-volatile memory for storing operating system files and/or user-generated data, for example. Essentially, data processing system 200 may be any known or later developed data processing system without architectural limitation.

As will be appreciated by one skilled in the art, the present invention may be embodied as a system, apparatus, or method. In one illustrative embodiment, the mechanisms are provided entirely in hardware, e.g., circuitry, hardware modules or units, etc. of a processor. However, in other illustrative embodiments, a combination of software and hardware may be utilized to provide or implement the features and mechanisms of the illustrative embodiments. The software may be provided, for example, in firmware, resident software, microcode, or the like. The various flowcharts set forth hereafter provide an outline of operations that may be performed by this hardware and/or combination of hardware and software.

In illustrative embodiments in which the mechanisms of the illustrative embodiments are at least partially implemented in software, any combination of one or more computer usable or computer readable medium(s) that store this software may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a random access memory (RAM), a read-only memory (ROM), an erasable programmable read-only memory (EPROM or Flash memory), etc.

Referring again to the figures, FIG. 3 is an exemplary block of an effective address table structure in accordance with one illustrative embodiment. As shown in FIG. 3, the EAT 300 is comprised of one or more entries, e.g., entry 0 to entry N, with each entry comprising a plurality of fields of information regarding a group of one or more instructions. For example, in one illustrative embodiment, each entry in the EAT 300 may represent between 1 and 32 instructions. Entries in the EAT 300 are created in response to a fetch of an instruction that is in a new cache line of the processor cache, e.g., the L2 cache 260 in FIG. 2. The entry in the EAT 300 is updated as additional instructions are fetched from the cache line. Each entry of the EAT 300 is terminated on a taken branch (i.e. a fetched branch instruction from the cache is resolved as "taken"), cache line crossing (i.e. the next fetched instruction is in a different cache line from the current cache line), or a flush of the processor pipeline (such as when a branch misprediction occurs or the like).

As shown in FIG. 3, the fields of the EAT 300 entry comprise a base effective address 310, a first instruction identifier 320, a last instruction identifier 330, a closed identifier 340, a global history vector field 350, a link stack pointer field 360, a branch taken identifier 370, and a branch information field 380. A head pointer 390 points to the head, or youngest entry, in the EAT 300. A tail pointer 392 points to the tail, or oldest entry, in the EAT 300. In addition, a tail+1 pointer 394 is provided for pointing to the entry in the EAT 300 that is second to the tail, or oldest, entry in the EAT 300.

The base effective address 310 is the starting effective address (EA) of the group of instructions. Each instruction in the group of instructions has the same base EA and then an offset from it. For example, in one illustrative embodiment, the EA is a 64 bit address comprising bits 0:63. The base EA may comprise, in one illustrative embodiment, bits 0:56 of this EA with bits 57:61 representing the offset from the base EA for the specific instruction within the group of instructions. Bits 62 and 63 point to a specific byte of each instruction. In the illustrative embodiment, each address references an instruction that is 32 bits long (i.e. 4 bytes), where each byte in memory is addressable. An instruction cannot be further divided into addressable subcomponents, and thus an instruction address will always have bits 62 and 63 set to zero. Therefore, bits 62 and 63 do not need to be stored and can always be assumed to be zero by the EAT.

The first instruction identifier field 320 stores the effective address offset bits, e.g., bits 57:61 of the EA for the first instruction in the group of instructions to which the EAT 300 entry corresponds. A combination of the base EA from field 310 and the effective address offset bits in the first instruction identifier field 320 provides the EA for the first instruction in the group of instructions represented by the EAT 300 entry. This first field 320 may be used, as discussed hereafter, for recovering a refetch address and branch prediction information in the event that the pipeline is flushed, for example.

The last instruction identifier field 330 stores the effective address offset bits, e.g., bits 57:61 of the EA, for the last instruction in the group of instructions to which the EAT 300 entry corresponds. EAT logic updates this field as additional instructions in the group of instructions represented by the EAT 300 entry are fetched. The EAT logic discontinues updating of this field 330 in the particular EAT 300 entry in response to the EAT 300 entry being closed when a cache line crossing or taken branch is found. This field will remain intact unless a pipeline flush occurs that clears out a portion of the EAT entry. In such cases, the EAT logic updates this field to store the effective address offset bits of the instruction that is now the new last instruction in the entry as a result of the flush.

This field is ultimately used for completion, as discussed hereafter, to release the entry in the EAT 300.

The closed identifier field 340 is used to indicate that the EAT 300 entry has been closed and no more instruction fetches will be made to fetch instructions for the instruction group corresponding to the EAT 300 entry. An EAT 300 entry may be closed for a variety of different reasons, including a cache line crossing, a branch being taken, or a flush of the pipeline. Any of these conditions may result in the value in the closed field 340 being set to indicate the EAT entry is closed, e.g., set to a value of "1." This field 340 is used at completion to release an entry in the EAT 300, as discussed in greater detail hereafter.

The global history vector field 350 identifies the global history vector for the first instruction fetch group that created the entry in the EAT 300. The global history vector is used to identify a history of whether branches were taken or not taken, as discussed in greater detail hereafter. The global history vector is used for branch prediction purposes to help in determining, based on the recent history of branches being taken or not taken, whether a current branch is likely to be taken or not.

The link stack pointer field 360 identifies the link stack pointer for the first instruction fetch group that created the entry in the EAT 300. The link stack pointer is another branch prediction mechanism that will be described in greater detail hereafter.

The branch taken field 370 indicates whether the group of instructions corresponding to the EAT 300 entry had a branch instruction in which the branch was taken. The value in the branch taken field 370 is updated in response to a branch instruction of the instruction group represented by the EAT 300 entry being predicted as taken. In addition, once a branch in the instructions of the EAT 300 entry is taken, the EAT 300 entry is also closed by writing the appropriate value to the closed field 340. Since the branch taken field is written speculatively at prediction time, it may need to be replaced with the correct value when the branch is actually executed. For example, a branch could be predicted as not taken, in which case a "0" would be written into the branch taken field. However, later in execution, the branch could be found to be taken, in which case the field must be corrected by writing it to a value of "1". Notice that this second write only occurs if the branch was mispredicted.

The branch information field 380 stores miscellaneous branch information that is used for updating branch prediction structures when a branch resolves, or architected EA state when a branch instruction completes. The use of each of these fields 310-380 will be described in greater detail hereafter with reference to the manner by which the EAT 300 is used by the processor architecture to perform various operations.

Entries in the EAT 300 are accessed using an effective address tag (eatag) that comprises at least two parts: base eatag and an eatag offset. In one illustrative embodiment, this eatag is a 10 bit value, which is relatively much smaller than the 64 bit effective address. With a 10 bit eatag value, and a EAT 300 having a size of 14 entries, in one exemplary implementation, the eatag is comprised of a first 5 bits, referred to as the base eatag, for identifying an entry within the EAT 300 and a second 5 bits, referred to as the eatag offset, for providing the offset of the specific instruction within the group of instructions represented by the entry in the EAT 300. A first bit in the 5 bits identifying the entry within the EAT 300 may be used as a wrap bit to indicate whether a wrap occurred when going from the topmost entry to the bottom most entry of the EAT 300. This may be used for age detection. The second through fifth bits of the 5 bits identifying the entry within the EAT 300 may be used to index into the EAT to identify the base EA of the instruction, i.e. EA(0:56). The 5 bit offset value may be used to provide, for example, bits 57:61 of the particular instruction's effective address. This example eatag is illustrated below:

eatag(0:9)=row(0:4)||offset(0:4)

row(0): Wrap bit for the EAT indicating whether or not a wrap occurred when going from the topmost entry to bottom most entry of the EAT.

row(1:4): Index into 14-entry EAT used to determine EA(0:56) of the instruction.

offset(0:4): Bits 57:61 of the instruction's EA.

Figure 4:
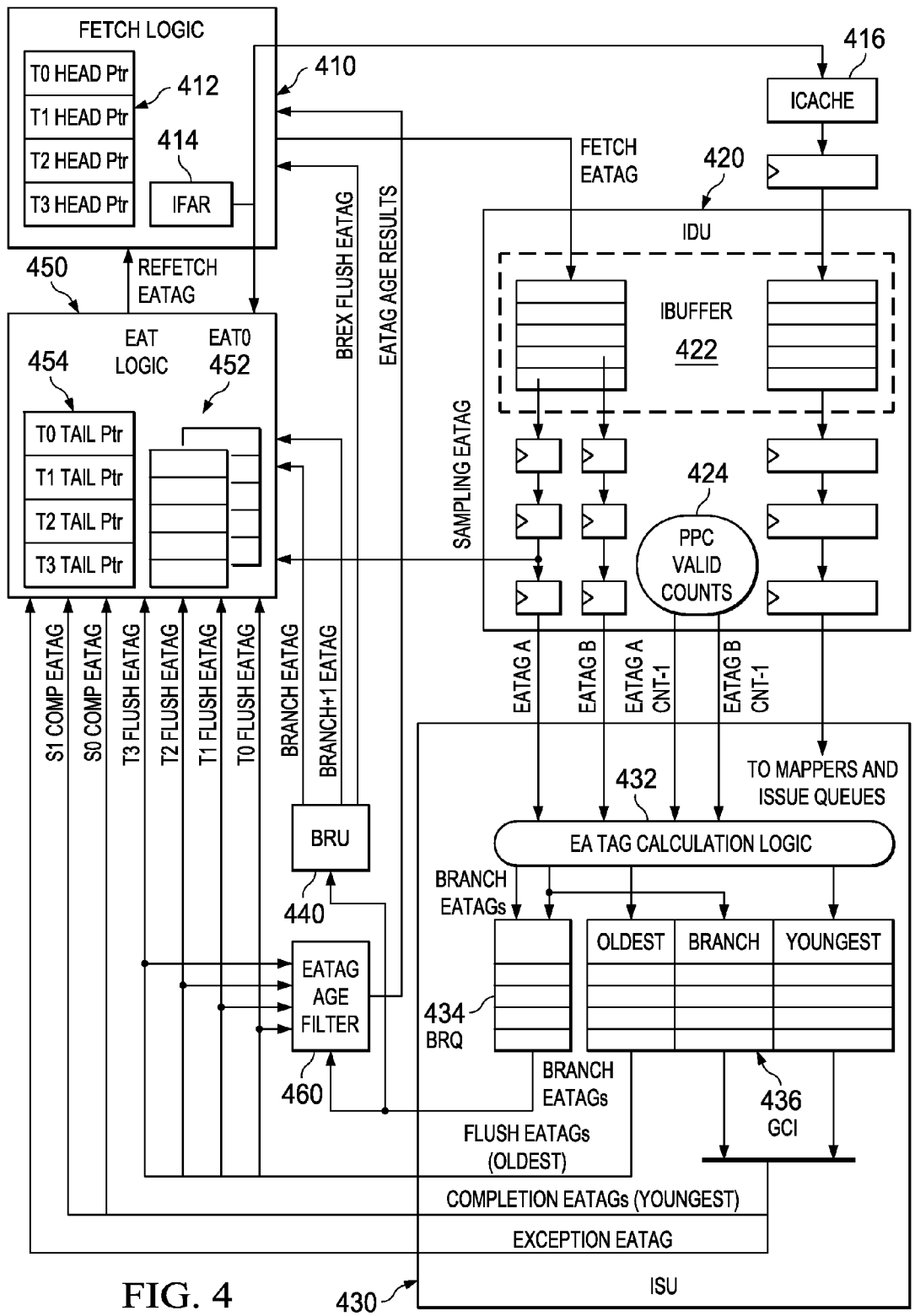
FIG. 4 illustrates an exemplary dataflow between elements of a processor implementing an EAT in accordance with one illustrative embodiment.

The operation and use of the EAT 300 will now be described in greater detail with reference to FIG. 4 which illustrates an exemplary dataflow between elements of a processor implementing an EAT in accordance with one illustrative embodiment. It should be appreciated that FIG. 4 illustrates the primary operational elements of a processor architecture that utilize the EAT of the illustrative embodiments to perform operations in an out-of-order execution. FIG. 4 does not illustrate all of the elements of a processor architecture, however it should be appreciated that the elements of FIG. 4 may be utilized with the other elements of the processor architecture shown in FIG. 2, for example.

As shown in FIG. 4 the primary operational elements of the processor architecture that utilize the EAT 300 are the fetch logic 410, the instruction dispatch unit 420, the instruction sequencer unit 430, the branch execution unit (BRU) 440, and the effective address table logic 450. The fetch logic 410, in one illustrative embodiment, corresponds to the front-end elements of processor architecture depicted in FIG. 2. These elements are the instruction cache 202 and branch prediction unit 280, which are responsible for fetching instructions from given effective address and generating the next effective address to fetch. The instruction dispatch unit 420 corresponds to the next sequential portion of the processor architecture in FIG. 2. These are the instruction fetch buffer 204 and instruction decode unit 206. The instruction sequencer unit 430 is a collection of the sequencing and global control elements of the processor architecture in FIG. 2. These elements are instruction dispatch unit 208, global completion table 210, and the issue queues 212-21. Each collection of elements, referred to by their collective unit name hereafter, utilize the central EAT structure when address information is needed in the pipeline.

With these mechanisms and the configuration of the EAT 300 previously discussed, an eatag is assigned for an instruction fetch group, e.g., a group of 8 instructions, based on the current head pointer of the EAT 300, where the head pointer points to the first available entry in the EAT 300. All instructions in the instruction fetch group have the same base eatag (bits 0:4). The instructions in the instruction fetch group will have different eatags with regard to the second 5 bits (bits 5:9) of the eatag which represent the specific instruction's offset from the base eatag. The base eatag is sent to the instruction dispatch unit (IDU) 420 where it is stored in the instruction buffer 422 with the instructions from the instruction cache 416. The next fetch of an instruction fetch group may be to the same base eatag if a condition does not occur requiring a new entry in the EAT 300 to be assigned, i.e. the base EA(0:56) is the same and thus the same entry in the EAT 300 can be used. The instruction fetch logic 410 assigns a new entry in the EAT 300 only when there is a cache line crossing or taken branch detected. In one illustrative embodiment, a cache line of the L2 cache may contain up to 32 instructions and thus, each EAT entry can represent up to 32 instructions.

In the depicted exemplary embodiment, within the IDU 420, instructions in the instruction buffer 422 are grouped into global completion table (GCT) instruction groups of up to 6 instructions (e.g. 4 non-branch instructions and 2 branch instructions). A set of eatags are calculated for the 6 instructions. The group formation may look across two different rows in the instruction buffer 422, which may contain instructions from up to 2 different ranges. Therefore, 2 base eatags are needed to represent the GCT instruction group. In addition, a count of the number of instructions, in each EA range, i.e. EAT entry, from each base EA represented by the 2 base eatags, in the GCT instruction group is determined by the POWER PC (PPC) valid count logic 424. The 2 base eatags and the 2 count values, i.e. PPC valid count values, are sent to the instruction sequencer unit (ISU) 430 with the instructions.

The grouping of instructions into GCT instruction groups helps to facilitate out-of-order execution. Out-of-order processor pipeline architectures track groups of instructions rather than individual instructions in order to reduce the overhead and complexity of actions such as out-of-order flushes. For example, in a machine using groups of instructions, the register rename state only needs to be check-pointed per group rather than per instruction. With the use of the EAT logic 450 and the EAT facilities 412, 452, and 454, group formation across multiple disjoint address ranges is made possible. This allows more dense groups of instructions to be created since only an additional base eatag needs to be tracked per GCT instruction group EA address range rather than an entire 64-bit address. In addition, flushing only a portion of a GCT instruction group becomes possible since flush EAs are calculated on the fly using eatags. Completion using the EAT logic 450 and EAT 452 can naturally handle GCT instruction groups with instructions from multiple EA ranges.

The eatag calculation logic 432 of the ISU 430 calculates 3 eatags from the 2 base eatags supplied by the IDU 420, the PPC valid counts for these 2 eatags, obtained from the PPC valid count logic 424 of the IDU 420, and a third piece of information, branch age, also obtained from the PPC valid count logic 424, which is the offset of the first branch instruction relative to the first base eatag. These 3 eatags are calculated by the eatag calculation logic 432 of the ISU 430 as instructions are placed into the instruction queues (not shown) and upon creation of a global completion table (GCT) entry for the GCT instruction group. A first calculated eatag is the eatag of the first instruction in the GCT instruction group. The first calculated eatag may be calculated by adding the offset of the first instruction to the first base eatag supplied by the IDU 420. A second calculated eatag is the eatag of the last instruction in the GCT instruction group. Again, the second calculated eatag may be calculated by adding the offset of the last instruction in the GCT to the second base eatag supplied by the IDU 420. However, if only one base eatag is utilized, then the first and second calculated eatags may be calculated based on the same base eatag.

A third calculated eatag is the eatag of each branch instruction in the GCT instruction group (there may be up to 2 branch instructions and thus, 2 branch eatags, since each entry in the EAT is terminated upon the occurrence of a taken branch). The first branch eatag may be calculated by adding the branch age supplied by the PPC valid count logic 424 to the first base eatag supplied by the IDU 420. Since groups are terminated on the occurrence of a second branch, the second branch eatag is always the last eatag in the group. This eatag may be calculated by first determining if one or two base eatags are utilized by the group. Valid bits are sent from the IDU 420 to the ISU 430 to communicate when one or two base eatags are utilized. If one base eatag is in use, the second branch eatag is calculated by adding the PPC valid count for the first eatag to the first base eatag. If two base eatags are in use, the second branch eatag is calculated by adding the PPC valid count for the second base eatag. The eatag for the first instruction, the last instruction, and the first branch instruction are stored in the global completion table 436. They will remain there until they are needed for pipeline flush events or until they are completed and removed from the global completion table 436. The handling of such events is described in detail hereafter.

Up to 2 branch eatags are stored in the branch issue queue (BRQ) 434. These eatags will remain in the BRQ until the time their specific branch instruction is issued. In this exemplary embodiment, only one branch instruction is chosen from the BRQ to issue at a time. Once chosen to execute, the branch eatag of the branch instruction is sent to the branch execution unit (BRU) 440. This branch eatag is used to calculate the effective address (EA) of the branch instruction which is needed later to determine the flush address, link register address, and to update the branch prediction structures such as the global branch history vector. In addition, the branch eatag is used to calculate the new EAT head pointer when a branch instruction flushes. These operations are described in greater detail hereafter.

The eatag of the oldest instruction in a GCT instruction group is sent out to the EAT logic when a group flushes. This eatag is used to calculate the EA to start fetching from after the flush. The eatag of the oldest instruction is also used to determine the new EAT head pointer and to restore the branch prediction structures, such as the global branch history vector, as described in greater detail hereafter.

In an out-of-order execution, instructions can flush out-of-order. Eatag age filtering logic 460 uses the eatags of the flushes to determine the age of flushes relative to each other. Younger flushes that become invalid due to older flushes are filtered out and take no action. This flush filtering will be described in greater detail hereafter.

The eatag of the youngest valid instruction in a GCT instruction group is sent out to the EAT logic when a group completes. This eatag is used to update the tail pointer of the EAT, which in turn retires an entry. The eatag of the youngest valid instruction in the GCT instruction group is also used to calculate the current instruction address (CIA) and various sampling/debug address registers that are typically updated when a group completes.

Moreover, eatags are also used to compute the next instruction address (NIA), when an instruction in a GCT instruction group is taking an exception. This address will be stored into save and restore registers in order to return to the current program flow after an exception is serviced. These save and restore registers are temporary storage areas which hold data from current program flow so that the processor remembers where to return after the exception has been processed. The EAT may be used to provide the NIA, which is the "return-to" address for such cases. When an exception occurs, the ISU 430 determines if the oldest or youngest eatag should be used. This is determined by the type of exception that has occurred. If the current GCT instruction group must be executed again after the exception processing, then the oldest eatag is used since control will resume at the start of this GCT instruction group. If the current instruction group will not be executed again, but will instead complete before taking the exception, then the youngest eatag is used since control will resume at the start of the next GCT instruction group. The EAT logic 450 generates the NIA from the eatag that is sent from the ISU 430 for such cases.

As mentioned above, the use of the EAT logic 450 and facilities 412 and 452-454 aids out-of-order processing of instructions by facilitating the grouping of instructions into GCT instruction groups that are tracked according to the eatag(s) corresponding to the EA range(s) in the GCT instruction group rather than having to track multiple 64-bit addresses. The GCT instruction group may be formed across multiple disjoint EA ranges such that each EA range is represented by an eatag rather than one or more 64-bit addresses. In the depicted example embodiment, the GCT instruction group may encompass instructions from up to two disjoint EA ranges.

Figure 5:
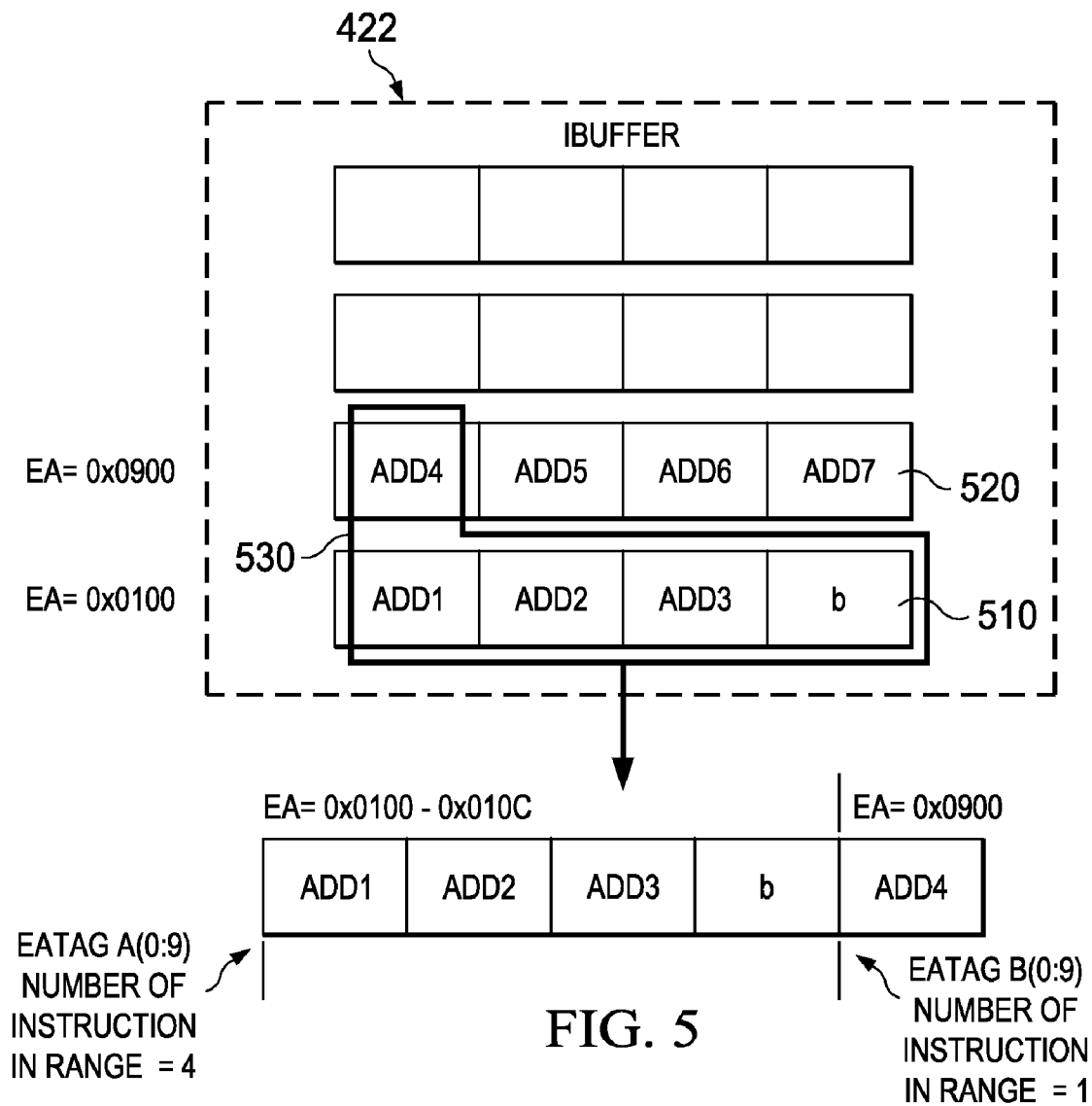
FIG. 5 is an example diagram of a Global Completion Table (GCT) instruction group being formed with instructions before and after a taken branch in accordance with one illustrative embodiment.

As an example consider a GCT instruction group being formed with instructions before and after a taken branch, as shown in FIG. 5. As shown in FIG. 5, entries in the instruction buffer 422 of the IDU 420 may contain 4 addresses for 4 instructions to be executed. A first entry 510 in the instruction buffer 422 comprises addresses add1, add2, add3, and a branch address b of a branch that is resolved as being taken. A second entry 520 comprises addresses add4, add5, add6, and add7. A GCT instruction group may be formed by grouping the instructions represented by the addresses in the first entry 510 with the first instruction address of the second entry 520, as shown in GCT instruction group 530.

In the depicted example, the GCT instruction group 530 only has 5 instructions because, in the illustrative embodiment, 4 non-branch instructions and 2 branch instructions may be contained in the instruction group. In the depicted example, the maximum of 4 non-branch instructions has been reached and the only instructions that can be inserted into the GCT instruction group to make a full 6 instruction group would be a second branch instruction which is not present in this example.

As shown in FIG. 5, this GCT instruction group 530 spans two entries 510 and 520 in the instruction buffer 422 and also includes instructions from two entries in the EAT 452. As such, 2 eatags are used to represent the GCT instruction group 530, i.e. the eatag of a first instruction in the first set of instructions prior to the taken branch instruction and the eatag of a first instruction in the second set of instructions after the taken branch instruction. The eatagA(0:9) is the eatag for the set of instructions from the first entry 510 up to and including the taken branch instruction, i.e. the eatag associated with the first instruction in the first entry 510. The eatagB(0:9) is the eatag for the set of instructions from the second entry 520 after the taken branch, i.e. the eatag associated with the first instruction in the second entry 520. The number of instructions, in the GCT instruction group 530, in the first EA range associated with the instructions prior to and including the branch instruction is 4. The number of instructions, in the GCT instruction group 530, in the second EA range associated with the instructions after the branch instruction is 1.

All that is necessary to dispatch the GCT instruction group 530 is the eatagA, eatagB, the offset of the first branch instruction from eatagA (i.e. branch age), and the number of instructions in each range. The eatag calculation logic 432 of the ISU 430 may calculate the first, last, and branch eatags from this information in order for the branch execution unit (BRU) 440, flush operations, and completion operations to proceed with processing of the GCT instruction group 530. To support these operations without an EAT, large addresses would need to be tracked down the processor pipeline, one for each address range in the GCT instruction group. Therefore, simply looking past a taken branch in group formation would require 2 large addresses (128 bits—64 for each address) to be sent to the ISU 430 rather than 2 relatively small eatags (20 bits—10 for each eatag) and two small count values.

Thus, the mechanisms of the illustrative embodiments greatly reduce the area requirements and power requirements for GCT instruction group formation and tracking. Further the area advantages of the mechanisms of the illustrative embodiments scale as additional address ranges are utilized, i.e. if instruction groups of greater numbers of address ranges are utilized, the benefits of the implementation of the present invention is even more pronounced.

Processing of the instructions in an entry of the EAT 452 of the EAT logic 450 is completed using the tail and tail+1 pointers 454 as well as the last and closed fields 330 and 340 of the EAT entry. As a group completes out of the GCT 436, i.e. all of the instructions in a GCT instruction group complete, the youngest valid eatag of the completing GCT instruction group is sent to the EAT logic 450. This eatag is all that is needed to update the EAT tail pointers and calculate any architected address state, such as the Current Instruction Address (CIA). The CIA marks the current place in a computer program where the processor is executing. This eatag of the youngest instruction in the completed GCT instruction group is compared against the last and closed fields 330 and 340 of the EAT entry corresponding to the base eatag, i.e. bits 0:4 of the eatag. Based on the comparison, tail and CIA values are updated as described hereafter with reference to FIG. 6. Since the GCT instruction group may comprise instructions from 2 different EA ranges, the youngest instruction in the completed GCT instruction group may be from either of these 2 EA ranges. Thus, both the tail pointer and the tail+1 pointers are checked in this manner and the tail and CIA values are updated appropriately.

Figure 6:
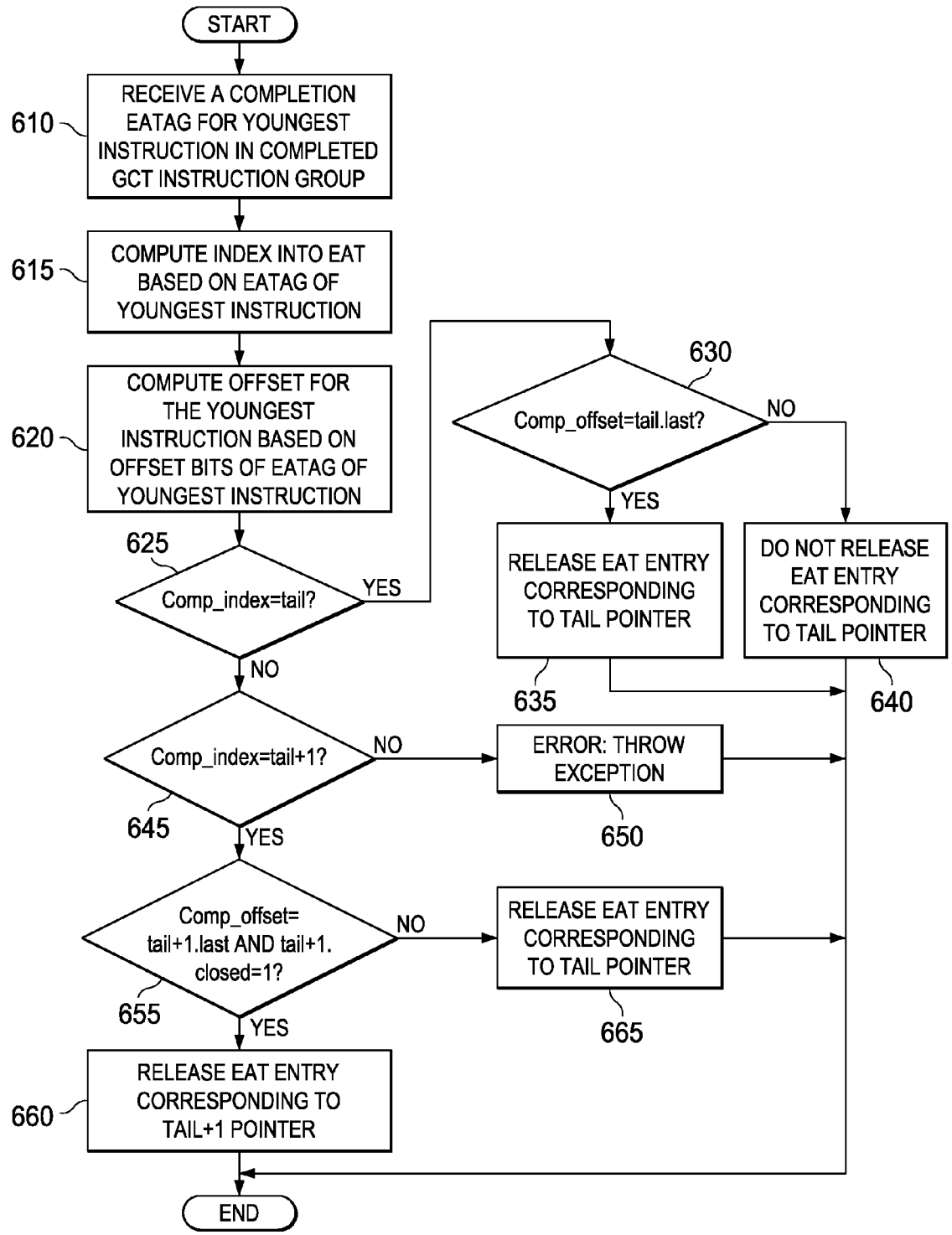
FIG. 6 is a flowchart outlining an exemplary operation for performing completion of a GCT instruction group in accordance with one illustrative embodiment.

FIG. 6 is a flowchart outlining an exemplary operation for performing completion of a GCT instruction group in accordance with one illustrative embodiment. The operations outlined in FIG. 6 may be implemented, for example, in the EAT logic 450 in FIG. 4, for example.

As shown in FIG. 6, the operation starts by receiving a completion eatag for the youngest instruction in the completed GCT instruction group (step 610). An index (comp_index) into the EAT is computed based on the eatag of the youngest instruction (step 615). An offset (comp_offset) for the youngest instruction is computed based on the offset bits of the eatag of the youngest instruction (step 620). For example, bits 1:4 of the eatag may be used as the computed index (comp_index) and bits 5:9 of the eatag may be used as the computed offset (comp_offset).

A determination is made as to whether the EAT entry pointed to by the index is also pointed to by the tail pointer (step 625). If so, then a determination is made as to whether the computed offset (comp_offset) for the youngest instruction is equal to the last instruction in the EAT entry pointed to by the tail pointer (tail.last) and the closed field of the EAT entry pointed to by the tail pointer (tail.closed) indicates that the entry is closed, i.e. is equal to 1 in the depicted example (step 630). If both conditions of step 630 are met, then the EAT entry corresponding to the tail pointer may be released (step 635). The release of this EAT entry may be performed, for example, by incrementing the tail pointer by 1 to point to the next oldest entry in the EAT, reading the EAT entry from the new tail pointer and setting the current instruction address (CIA) to the first instruction in the EAT entry corresponding to the new tail pointer position, e.g., setting CIA(0:56) equal to the base effective address for the EAT entry (tail.ea(0:56)) and setting CIA(57:61) equal to the offset corresponding to the first instruction specified in the EAT entry (tail.first). If both conditions of step 630 are not met, then the EAT entry corresponding to the tail pointer cannot be released (step 640). In such a situation, the tail pointer is not incremented and the base address bits of the CIA are not updated, i.e. CIA(0:56) is not updated. However, the offset bits of the CIA, i.e. CIA(57:61) may be incremented to be equal to the computed offset (comp_offset)+1.

If the computed index (comp_index) does not point to the same EAT entry as the tail pointer (step 625), then a determination is made as to whether the computed index points to the same EAT entry as the tail+1 pointer, i.e. the next to oldest EAT entry (step 645). If not, then an error has occurred and an exception may be thrown with appropriate exception handling being invoked (step 650). When this exception occurs, the processor halts all further execution and recovery actions are taken. These actions may include flushing the processor pipeline and re-executing the instruction from the point of the CIA onward, or halting execution by exiting out of the current program and returning control to the operating system with an error notice.

If the EAT entry pointed to by the computed index is the same as the one pointed to by the tail+1 pointer, then a determination is made as to whether the computed offset (comp_offset) for the youngest instruction is equal to the last instruction in the EAT entry pointed to by the tail+1 pointer (tail+1.last) and the closed field of the EAT entry pointed to by the tail+1 pointer (tail+1.closed) indicates that the entry is closed, i.e. is equal to 1 in the depicted example (step 655). If both conditions of step 655 are met, then the EAT entries corresponding to the tail and tail+1 pointers may be released (step 660). The release of this EAT entries may be performed, for example, by incrementing the tail pointer by 2 to skip the EAT entry pointed to by the tail+1 pointer, reading the EAT entry from the new tail pointer and setting the current instruction address (CIA) to the first instruction in the EAT entry corresponding to the new tail pointer position, e.g., setting CIA(0:56) equal to the base effective address for the EAT entry (tail.ea(0:56)) and setting CIA(57:61) equal to the offset corresponding to the first instruction specified in the EAT entry (tail.first). If both conditions of step 655 are not met, then the EAT entry corresponding to the tail+1 pointer cannot be released but the EAT entry corresponding to the tail pointer can be released (step 640). In such a situation, the EAT entry corresponding to the tail pointer may be released by incrementing the tail pointer by 1, reading the EAT entry from the new tail pointer and setting the current instruction address (CIA) to the first instruction in the EAT entry corresponding to the new tail pointer position, e.g., setting CIA(0:56) equal to the base effective address for the EAT entry (tail.ea(0:56)) and setting CIA(57:61) equal to the offset corresponding to the first instruction specified in the EAT entry (tail.first). The operation then terminates.

Thus, with the EAT mechanisms of the illustrative embodiments, GCT instruction groups may be easily formed and tracked using only eatags and a number of instructions associated with each eatag in the GCT instruction group. Completion of GCT instruction groups may be handled by providing only the eatag of the youngest instruction in the GCT instruction group to the EAT logic which then uses the eatag of the youngest instruction to update the pointers to the EAT. In addition to these operations, the EAT may be used to efficiently handle flushes of the pipeline and determination of instructions to dispatch following the flush.

When a flush occurs, such as when there is a branch misprediction, or the like, the processor pipeline is redirected to a new EA using a flush eatag. The flush eatag points to the oldest valid instruction in the GCT group that is flushing. All instructions with eatags younger or equal to this eatag are invalidated in the processor pipeline and instruction fetching resumes at the EA specified by the eatag. This EA is determined by combining the base EA, which is stored in the EAT entry pointed to by the flush eatag, with the offset of the flush eatag.

Figure 7:
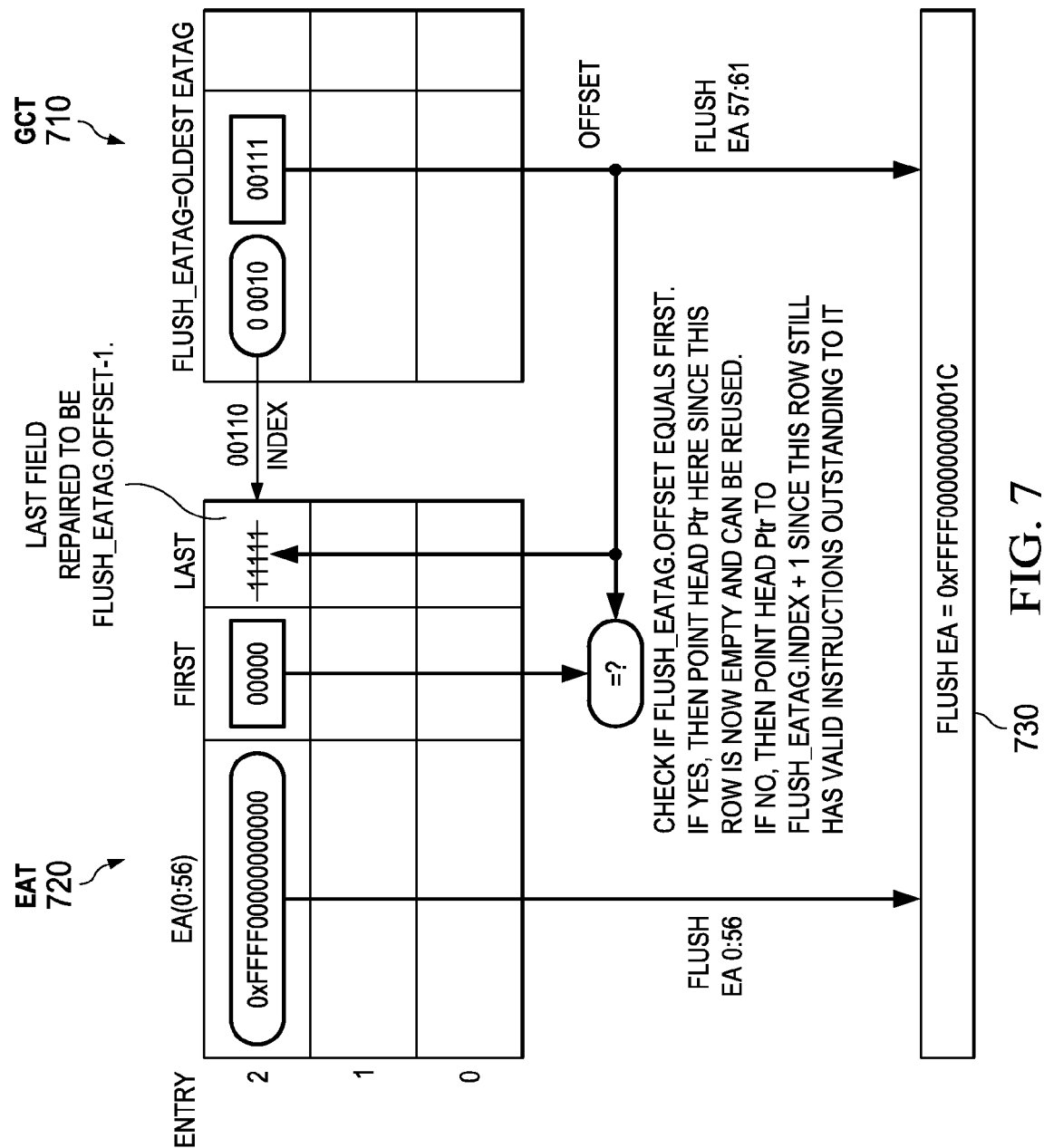
FIG. 7 is an example diagram illustrating a flush operation using an EAT in accordance with one illustrative embodiment.

FIG. 7 is an exemplary diagram illustrating a flush operation using an EAT in accordance with one illustrative embodiment. As shown in FIG. 7, the flush eatag is the oldest eatag in the GCT instruction group in which the flush occurs, i.e. in which an instruction causing the flush is grouped. The base eatag, e.g., the first 5 bits of the eatag, of the oldest eatag in the GCT instruction group is retrieved from the GCT 710 and used to index into the EAT 720. The base EA for the corresponding EAT entry is combined with the eatag offset of the flush eatag to generate the flush EA 730. In addition, the flush eatag's offset is compared to the value of the first field in the corresponding EAT entry. If the flush eatag's offset is equal to the first instruction's eatag offset in the first field of the EAT entry, then the head pointer is pointed to this EAT entry since it is now empty and can be reused. If the flush eatag's offset is not equal to the first instruction's eatag offset in the first field of the EAT entry, then the head pointer is pointed to the flush eatag's index+1 since the EAT entry still has valid instructions outstanding in it.

In order for completion to proceed as normal, the EAT is repaired for the EAT entry containing the instruction group that flushed. A simple policy for managing this is to close out an EAT entry that has had a flush occur within it, i.e. by setting the value in the closed field of the EAT entry to indicate the EAT entry to be closed. For example, remembering that an EAT entry can represent up to 32 instructions, if instruction 28 and younger instructions are flushed the last field of the EAT entry may be altered to point to instruction 27 as instructions 28 through 31 have been flushed. The closed field value may then be set to indicate the EAT entry to be closed, e.g., setting the closed bit value to "1," as no more instructions are allowed to be included in this EAT entry.

This repair work is performed in order for completion to proceed as normal. In the example above once instruction 27 completes, the tail pointer is incremented to point to the next EAT entry. If the last field was not changed, the completion algorithm would still be looking for instructions 28 through 31 to complete.

Figure 8:
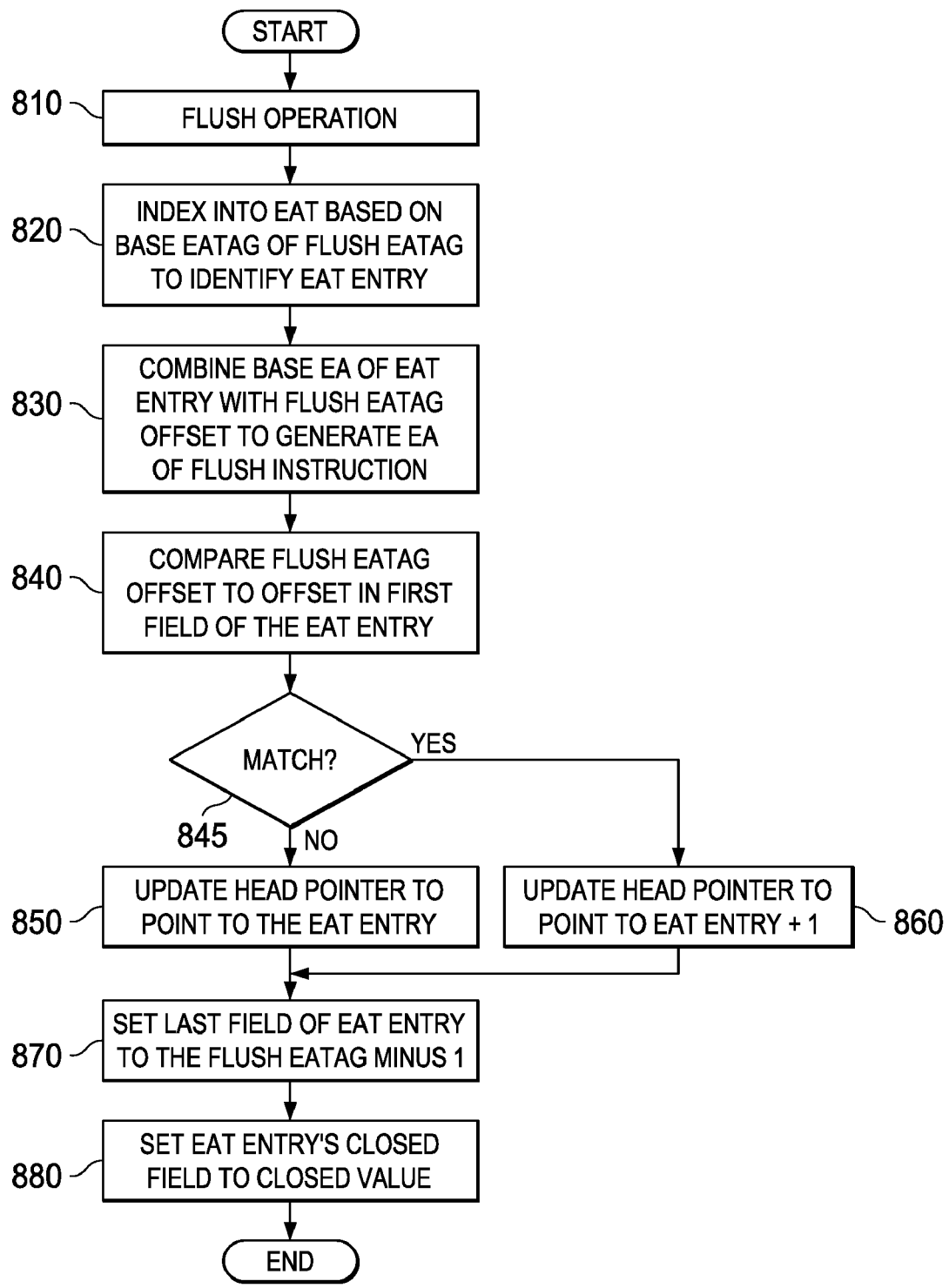
FIG. 8 is a flowchart outlining an exemplary operation for performing a repair operation for a flush in accordance with one illustrative embodiment.

FIG. 8 is a flowchart outlining an exemplary operation for performing a repair operation for a flush in accordance with one illustrative embodiment. As shown in FIG. 8, the operation starts with a flush operation occurring (step 810). The base eatag of the flush eatag is used to index into the EAT to identify an EAT entry (step 820). The base EA of the identified EAT entry is combined with the flush eatag offset to generate the EA of the flush instruction (step 830). The flush eatag offset is compared to the offset in the first field of the EAT entry (step 840). If there is a match, then the head pointer is updated to point to the EAT entry (step 850). If there is not a match, then the head pointer is updated to point to the EAT entry+1 (step 860).

The EAT entry's last field is set to the flush eatag minus 1 (step 870). The EAT entry's closed field is set to indicate that the EAT entry is closed (step 880). The operation then terminates.

In an out-of-order processor pipeline, flushes can occur out of program order. If a younger flush occurs after an older flush, i.e. a younger instruction (an instruction fetched after a previous instruction) results in a flush occurring after an older instruction (an instruction fetched before another instruction) results in a flush, the younger flush is filtered out and ignored. Eatags provide an easy way to determine age. A simple comparison between eatags determines age. For example, if a younger branch flush occurs at the same time as an older group flush, the group flush eatag will have an "older" index and offset value. This comparison result can be used to ignore the branch flush. This comparison can be performed by the eatag flush filter 460 which then outputs the eatag of the oldest flush that occurs. The output is provided to the fetch logic 410 for fetching the instruction corresponding to the oldest eatag following the flush.

The EAT mechanisms of the illustrative embodiments may further be used to aid with exception handling by the processor. When a processor takes an exception, a "return-to" address needs to be saved. In accordance with the mechanisms of the illustrative embodiments, this address is supplied by the EAT. The return-to address is calculated from an eatag that is sent from the instruction sequencing unit (ISU) 430 at the time the exception occurs. The EAT logic 450 looks up the eatag in the EAT 452 to obtain the base EA of the corresponding EAT entry, in a similar fashion as finding a flush eatag's corresponding base EA. This base EA is moved to the save and restore registers, e.g., HSSR0 in the POWER PC™ architecture.

As a further benefit, branch prediction information can also be stored with the return-to address since it is readily available. For example, when the exception occurs, the global history vector (GHV) may be retrieved from the EAT, the GHV being a bit-string that specifies the history of branch predictions. The exact GHV at the time of the exception may then be determined and stored off in a scratch register. The GHV information may then be restored when returning from an exception.

One major benefit of the EAT logic 450 and EAT 452 is that it eliminates the need for a separate branch information queue (BIQ) which stores information needed for branch execution. This is because the EAT and eatags provide all of the information for branch execution. The way in which branch execution is supported by use of the EAT and branch instruction's eatag is illustrated in FIG. 9.

Figure 9:
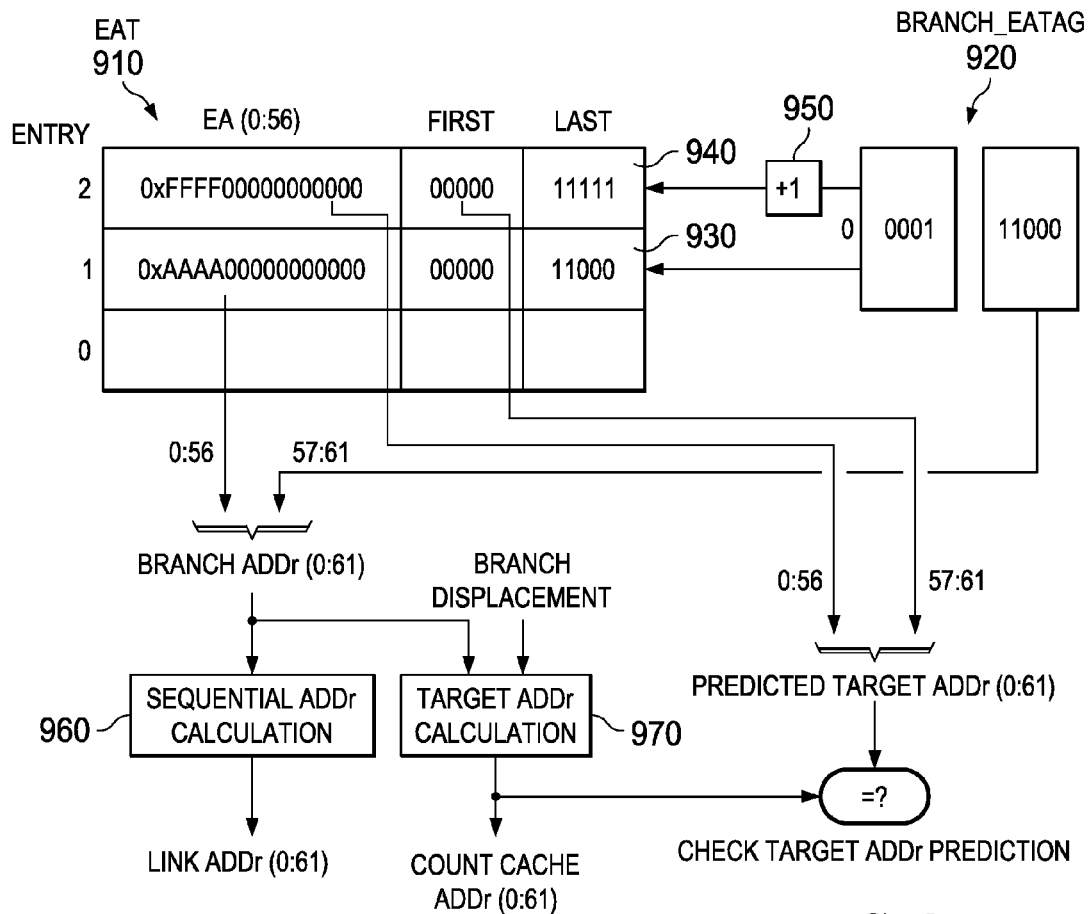
FIG. 9 illustrates an example manner by which branch execution is supported by use of the EAT and branch instruction's eatag in accordance with one illustrative embodiment.

As shown in FIG. 9, the EAT 910 supports branch execution by supplying the address of the branch instruction as well as its target address if it was predicted as taken. When a branch issues, an eatag is sent to the BRU 440. This is the branch_eatag 920 which points to the EAT entry 930 and an offset within the group of instructions represented by the EAT entry 930, the offset pointing to the particular branch instruction within the group of instructions. This information is all that is needed to determine the EA of the branch instruction, i.e. combining the base EA from the EAT entry 930 with the eatag offset of the branch eatag.

Since EAT entries are terminated on predicted taken branches, if the branch was predicted as taken, its predicted target address must sit at the branch_eatag+1 EAT entry in the EAT 910, i.e. EAT entry 940 in the depicted example, as it will be the first address fetched after the branch instruction. This first address fetched after the branch instruction must be in a new EAT entry since the branch was predicted as taken, resulting in the prior EAT entry being closed. Therefore, by simply incrementing the branch eatag 920, such as by using incrementer 950, and accessing the EAT 910 based on the incremented eatag, the predicted target address can also be determined. For example, the predicted target address is determined by combining the base EA of the branch_eatag+1 EAT entry with that entry's first field offset value. Thus, from one eatag, all branch information can be retrieved or recreated for a branch to resolve.

Once the branch address is determined from the branch eatag, it is passed to the Sequential Address Calculation logic 960, and the Target Address Calculation logic 970, which generate all remaining addresses required to be produced from the branch execution unit. The Sequential Address Calculation logic 960 calculates the next sequential address based off of the branch address. In the illustrative embodiment, where instructions are 4 bytes long, this involves simply adding a value of "4" to the branch address. This address is used by branch-and-link instructions to capture a return address for use with a future branch-to-link instruction. In the POWER PC™ architecture, this address is stored in the Link Register. Using this mechanism, control can branch off to a subroutine, and easily return the linked address when finished. The Target Address Calculation logic 970 calculates the target address of a branch instruction based on the branch address and the branch displacement that is specified inside the branch instruction. This address is then compared to the predicted target address provided by the EAT. If the addresses do not match, then a misprediction has occurred and the processor pipeline must be flushed. The mechanisms of the EAT allow these address calculations to be performed on-demand in the branch execution using the 10 bit branch eatag.

In addition to branch addresses, the EAT 910 also tracks branch prediction information. As mentioned above, the GHV is a bit string that specifies the history of branch predictions. A "1" is shifted into the GHV from the right if an instruction fetch group contains a predicted taken branch. A "0" is shifted in from the right if an instruction fetch group does not contain a predicted taken branch. In this way, a record of the most recent predictions is maintained and can be used to predict the next branch behavior.

The GHV is used at branch execution time as an index for a portion of the branch prediction structures that are updated upon branch resolution. The GHV is also used in the case of a branch misprediction so that the branch's prediction structures can be restored to the correct value.

The GHV that is stored in the EAT entry is for the first instruction fetched that caused the EAT entry to be created. By knowing the branch instruction's address offset from this first instruction in the EAT entry, the branch's GHV can be determined. The lower parts of the branch's eatag are the branch's EA offset, e.g., bits 57:61 of the EA. Subtracting the EAT entry first field from the branch's EA offset indicates the number of fetch groups this branch is away from the first instruction in the EAT entry. This can then be used to generate the precise GHV for the branch instruction. This operation for determining the GHV for a branch instruction based on the GHV for a first instruction of an EAT entry is shown in FIG. 10.

Figure 10:
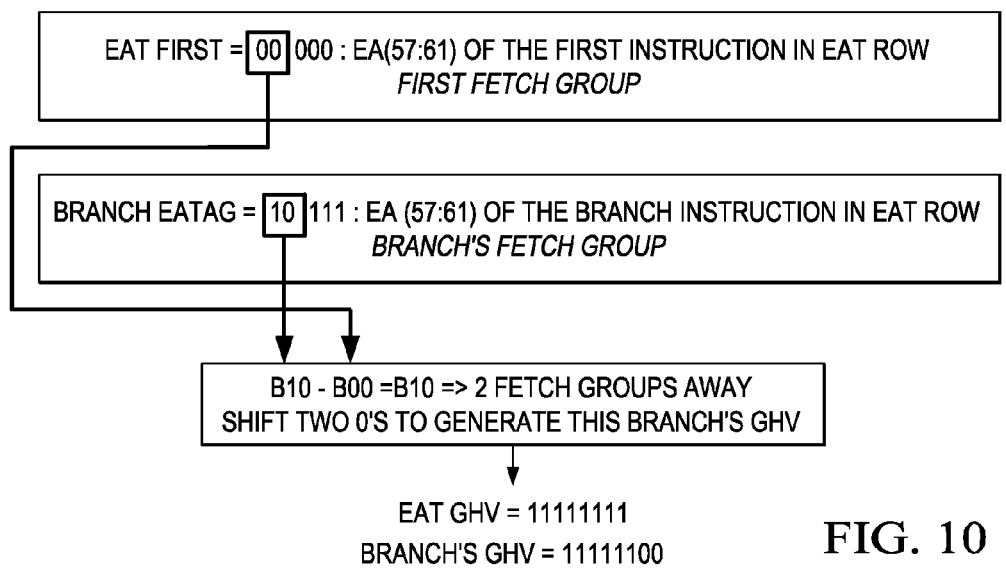
FIG. 10 illustrates an example operation for determining the Global History Vector (GHV) for a branch instruction based on the GHV for a first instruction of an EAT entry in accordance with one illustrative embodiment.

As shown in FIG. 10, the value of the first field of the EAT entry corresponding to the branch eatag is obtained and the branch eatag's offset portion is subtracted from the first field value to obtain the number of instruction fetch groups away from the first instruction that the branch instruction is in. This number of instruction fetch groups is then used as the number of 0's to shift into the GHV stored in the EAT entry, i.e. the GHV corresponding to the first instruction that created the EAT entry. In the depicted example, the branch instruction is 2 instruction fetch groups away from the first instruction of the EAT entry and thus, 2 zeros are shifted into the GHV stored in the EAT entry to thereby generate the GHV for the branch instruction.

The link stack pointer (LSP) is another branch prediction structure used in branch execution. This value is used to restore the link stack if the branch is mispredicted. The LSP that is stored in the EAT entry is for the first instruction fetch group that caused the EAT entry to be created. Since the LSP only changes value on predicted taken branches, the LSP that is stored in the EAT entry will be the LSP to use for all branches in the EAT entry. Thus, no modification to the LSP is necessary.

These prediction mechanisms operate even for out-of-order branch execution. For example, assume that branch instruction B (Branch B) is younger than branch instruction A (Branch A) and is issued first. If Branch B flushes, it will generate a new GHV assuming all branches ahead of it in the EAT entry were not taken. If the older branch, Branch A, is issued later and found to flush, it will wipe out the temporary execution of Branch B. Thus, Branch B may assume that Branch A was not taken since in order to get to Branch B, Branch A had to have been not taken. If this is later found to be incorrect, a flush will still restore the GHV correctly.

As mentioned above, the EAT entry may be repaired when there is a flush operation. However, another action that takes place during branch execution is the repair of the EAT entry if the branch was found to be mispredicted. Such repair is performed in order for completion to take place as normal. This repair is similar to the repair performed when there is an GCT instruction group flush. If the branch was incorrectly predicted as not taken, the last field of the EAT entry corresponding to the branch's eatag is changed to point to the branch eatag offset. This is because the branch is now taken and is the last valid instruction in the EAT entry.

If the branch was incorrectly predicted as taken, the last field does not need to be updated. The only update that needs to occur is to clear the branch taken value in the EAT entry so that the completion logic will not try to update architected sampling registers based on the branch being taken. Many architectures include sampling registers which record address information about the current program flow. For example, in the POWER PC architecture, the Come-From Address Register (CFAR) is one such register. It captures the address of each completed taken branch instruction. This information can be used by software to determine which branch instruction took them to their current place in the program. The EAT branch taken bit provides a low cost way to control the update of these registers when an instruction group completes.

Thus, the illustrative embodiments provide mechanisms for efficiently tracking effective addresses through a processor pipeline that minimizes area and power consumption. The mechanisms of the illustrative embodiments track such effective addresses even during out-of-order execution. Moreover, the mechanisms provide functionality for handling instruction grouping, instruction completion, instruction flushes, exception handling, and branch execution. The mechanisms of the illustrative embodiments simplify these operations by providing an effective address table that is accessed using eatags.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for tracking effective addresses through a processor pipeline of the data processing system, the method comprising:

fetching an instruction from an instruction cache;

associating, by an effective address table logic in the data processing system, an entry in an effective address table (EAT) data structure with the fetched instruction;

associating, by the effective address table logic, an effective address tag (eatag) with the fetched instruction, the eatag comprising a base eatag that points to the entry in the EAT and an eatag offset identifying the fetched instruction in association with the entry in the EAT, wherein the eatag offset is an offset from the base eatag; and processing the instruction through the processor pipeline utilizing the EAT by processing the eatag.

2. The method of claim 1, wherein:

the entry in the EAT is associated with a plurality of instructions in a group of instructions, the entry in the EAT is created in response to a fetch of a first instruction in the group of instructions from a new cache line of the instruction cache of the data processing system, and the entry in the EAT is updated as additional instructions are fetched from the cache line.

3. The method of claim 2, wherein updating of the entry in the EAT as additional instructions are fetched from the cache line is discontinued in response to a fetched instruction in the group of instructions being a taken branch instruction or an instruction being fetched from another cache line in the instruction cache of the data processing system.

4. The method of claim 1, wherein the instruction is fetched as part of an instruction fetch group fetched from an instruction cache, and wherein all of the instructions in the instruction fetch group have a same base eatag but have different eatag offsets, and wherein the base eatag is sent to an instruction dispatch unit where it is stored in an instruction buffer with the instructions of the instruction fetch group fetched from the instruction cache.

5. The method of claim 4, further comprising:

grouping instructions in the instruction buffer into at least one global completion table (GCT) instruction group;

calculating a set of eatags for each GCT instruction group, the set of eatags comprising a plurality of base eatags;

calculating, for each GCT instruction group, and for each effective address range associated with the GCT instruction group, a count of a number of instructions from the base eatag included in the GCT instruction group; and providing the set of eatags and the count of a number of instructions for each effective address range of the GCT instruction group to an instruction sequencer unit along with the instructions in the GCT instruction group.

6. The method of claim 5, further comprising, for each global completion table instruction group:

calculating, in the instruction sequencer unit, a plurality of calculated eatags corresponding to a first instruction in the GCT instruction group and at least one of an eatag of a last instruction in the GCT instruction group or an eatag of a branch instruction in the GCT instruction group, based on a set of eatags and count of number of instructions for each effective address range associated with the GCT instruction group;

placing the calculated eatags into at least one instruction queue; and storing the calculated eatags in a global completion table in association with the GCT instruction group.

7. The method of claim 6, further comprising:

in response to a flush, sending an eatag of an oldest instruction in a GCT instruction group associated with an instruction causing the flush to the effective address table logic; and determining an EAT head pointer and restoring branch prediction structures based on the eatag of the oldest instruction.

8. The method of claim 7, further comprising:

in response to multiple flushes occurring, using eatags of instructions causing the flushes to identify one or more younger flush instructions; and invalidating flushes associated with the one or more younger flush instructions.

9. The method of claim 6, further comprising:

sending an eatag of a youngest instruction in the GCT instruction group in response to all instructions in the GCT instruction group completing; and calculating a current instruction based on the eatag of the youngest instruction in the GCT instruction group.

10. The method of claim 1, wherein each entry in the EAT comprises a base effective address, a first instruction identifier, a last instruction identifier, a closed identifier, a global history vector field, a link stack pointer field, and a branch taken identifier.

11. A data processing system, comprising:

a processor pipeline;

an instruction cache coupled to the processor pipeline; and effective address table logic coupled to the processor pipeline, wherein:

instruction fetching logic of the processor pipeline fetches an instruction from the instruction cache, the effective address table logic associates an entry in an effective address table (EAT) data structure with the fetched instruction, the effective address table logic associates an effective address tag (eatag) with the fetched instruction, the eatag comprising a base eatag that points to the entry in the EAT and an eatag offset identifying the fetched instruction in association with the entry in the EAT, wherein the eatag offset is an offset from the base eatag, and the processor pipeline processes the instruction utilizing the EAT by processing the eatag.

12. The system of claim 11, wherein:

the entry in the EAT is associated with a plurality of instructions in a group of instructions, the entry in the EAT is created in response to a fetch of a first instruction in the group of instructions from a new cache line of the instruction cache of the data processing system, and the entry in the EAT is updated as additional instructions are fetched from the cache line.

13. The system of claim 12, wherein updating of the entry in the EAT as additional instructions are fetched from the cache line is discontinued in response to a fetched instruction in the group of instructions being a taken branch instruction or an instruction being fetched from another cache line in the instruction cache of the data processing system.

14. The system of claim 11, wherein the instruction is fetched as part of an instruction fetch group fetched from an instruction cache, and wherein all of the instructions in the instruction fetch group have a same base eatag but have different eatag offsets, and wherein the base eatag is sent to an instruction dispatch unit where it is stored in an instruction buffer with the instructions of the instruction fetch group fetched from the instruction cache.

15. The system of claim 14, further comprising:

an instruction dispatcher unit;

an instruction buffer coupled to the instruction dispatcher unit; and an instruction sequencer unit coupled to the instruction dispatch unit, wherein the instruction dispatch unit:

groups instructions in the instruction buffer into at least one global completion table (GCT) instruction group, calculates a set of eatags for each GCT instruction group, the set of eatags comprising a plurality of base eatags, calculates, for each GCT instruction group, and for each effective address range associated with the GCT instruction group, a count of a number of instructions from the base eatag included in the GCT instruction group, and provides the set of eatags and the count of a number of instructions for each effective address range of the GCT instruction group to the instruction sequencer unit along with the instructions in the GCT instruction group.

16. The system of claim 15, wherein, for each global completion table instruction group:

the instruction sequencer unit calculates a plurality of calculated eatags corresponding to a first instruction in the GCT instruction group and at least one of an eatag of a last instruction in the GCT instruction group or an eatag of a branch instruction in the GCT instruction group, based on a set of eatags and count of number of instructions for each effective address range associated with the GCT instruction group, the instruction sequencer unit places the calculated eatags into at least one instruction queue, and the instruction sequencer unit stores the calculated eatags in a global completion table in association with the GCT instruction group.

17. The system of claim 16, wherein, in response to a flush:

the instruction sequencer unit sends an eatag of an oldest instruction in a GCT instruction group associated with an instruction causing the flush to the effective address table logic, and the effective address table logic determines an EAT head pointer and restores branch prediction structures based on the eatag of the oldest instruction.

18. The system of claim 17, further comprising:

eatag age filtering logic coupled to the instruction sequencer unit, wherein, in response to multiple flushes occurring, the eatag age filtering logic filters eatags of instructions causing the flushes to identify one or more younger flush instructions and flushes associated with the one or more younger flush instructions are invalidated.

19. The system of claim 16, wherein the instruction sequencer unit sends an eatag of a youngest instruction in the GCT instruction group in response to all instructions in the GCT instruction group completing, and wherein a current instruction is calculated based on the eatag of the youngest instruction in the GCT instruction group.

20. The system of claim 11, wherein each entry in the EAT comprises a base effective address, a first instruction identifier, a last instruction identifier, a closed identifier, a global history vector field, a link stack pointer field, and a branch taken identifier.

21. The method of claim 1, wherein:
the entry in the EAT data structure comprises a base effective address of the instruction fetched from the instruction cache which specifies a beginning memory location of a set of one or more instructions comprising the instruction fetched from the instruction cache,
the effective address of the instruction is not passed between stages of the processor pipeline, and
the effective address of the instruction is tracked by passing the eatag through the processor pipeline and utilizing the EAT based on the eatag.

22. The system of claim 11, wherein:
the entry in the EAT data structure comprises a base effective address of the instruction fetched from the instruction cache which specifies a beginning memory location of a set of one or more instructions comprising the instruction fetched from the instruction cache,
the effective address of the instruction is not passed between stages of the processor pipeline, and
the effective address of the instruction is tracked by passing the eatag through the processor pipeline and utilizing the EAT based on the eatag.

* * * * *